United States Patent [19]
Aralt

[11] 3,836,019
[45] Sept. 17, 1974

[54] ASSEMBLY FOR UNLOADING POWDERED OR SIMILAR MATERIAL FROM A SHIP'S HOLD

[75] Inventor: Per Tybring Aralt, Hop, Norway
[73] Assignee: Kristian G. Jebsen, Bergen, Norway
[22] Filed: Mar. 5, 1973
[21] Appl. No.: 338,241

[30] Foreign Application Priority Data
Mar. 8, 1972 Norway.................................. 728/72

[52] U.S. Cl.................................................. 214/14
[51] Int. Cl............................................ B65g 63/04
[58] Field of Search................ 214/14; 198/77, 217

[56] References Cited
UNITED STATES PATENTS
3,392,818   7/1968   Baschant............................. 214/14
FOREIGN PATENTS OR APPLICATIONS
1,394,529   2/1965   France................................. 214/14

*Primary Examiner*—Robert J. Spar
*Assistant Examiner*—George F. Abraham
*Attorney, Agent, or Firm*—Kenyon & Kenyon Reilly Carr & Chapin

[57] ABSTRACT

An assembly for unloading powdered material and the like from a ship's hold which comprises three conveyors and a delivery pipe linked to each other about mutually parallel horizontal axes. The delivery pipe is stationarily positioned relative to the conveyors for downwardly receiving the material from a third conveyor. The conveyors and delivery pipe together with a supply head for feeding the material to a first conveyor provide a dust-tight, closed passage for the powdered material. The supply head houses screw conveyors adapted to transfer the material to a portion of said supply head from which screw conveyors of the first conveyor directly extend. The point of linkage between first and second conveyors is suspended from and regulatable vertically and horizontally by way of ship crane means while the point of linkage between second and third conveyors is supported outside the ship on elevated guide means extending transversely of the direction of the ship.

14 Claims, 3 Drawing Figures

PATENTED SEP 17 1974          3,836,019

ASSEMBLY FOR UNLOADING POWDERED OR SIMILAR MATERIAL FROM A SHIP'S HOLD

This invention relates to an assembly for unloading powdered or similar material from a ship's hold.

In the unloading installation discussed here it is of big significance that the unloading is effected in a dust-tight manner.

Furthermore, it is of big significance that the various conveyors can be supported in an effective manner and, at the same time, can be adjusted into various desired positions relative to each other depending upon the ship's draught in a loaded or unloaded condition, depending on the tide changes and depending on the dimensions of the ship's hold.

With the present invention the aim is an unloading assembly which is easy to regulate according to the conditions, at the same time as ensuring effective dust sealing and effective support for the unloading assembly in the various relevant positions which the unloading assembly must occupy.

According to the present invention an assembly for unloading powdered material and the like from a ship's hold comprises a supply head, a first conveyor arranged to receive said material fed from the supply head, a second conveyor arranged to receive said material on being lifted from the hold by said first conveyor, a third conveyor arranged to receive said material on being transferred by said second conveyor from a position above the hold to an elevated position outside the ship and a delivery pipe stationarily positioned relative to said conveyors for downwardly receiving said material from said third conveyor, said conveyors and said delivery pipe being linked to each other about mutually parallel horizontal axes and said supply head, said conveyors and said delivery pipe providing a dust-tight, closed passage for the powdered material, the improvement which consists in the supply head housing screw conveyors adapted to transfer said material to a supply head portion from which upstanding screw conveyors of said first conveyor directly extend, the point of linkage between the first and second conveyors being suspended from and regulatable vertically and horizontally by way of ship crane means while the point of linkage between the second and third conveyors is supported outside the ship on elevated guide means extending transversely of the direction of the ship.

In such an articulated unloading assembly, one can manage with a minimal extension of only the third conveyor or of the connection between the third conveyor and the delivery pipe, since there can be inserted a simple bellows connection in the one point of linkage of the third conveyor or the third conveyor can be designed as a simple telescopic pipe connection, which can compensate for the displacement of the delivery end of the second conveyor under the various positions which the unloading assembly must assume. By means of the horizontal guide for the delivery end of the second conveyor, the second conveyor can be brought without complications into the movements which are conveyed to the unloading assembly on manoeuvring via the derrick or loading crane of the ship.

In order that the invention can be more clearly understood, a convenient embodiment thereof will now be described, by way of example, with reference to the accompanying drawings in which.

Figure 1:
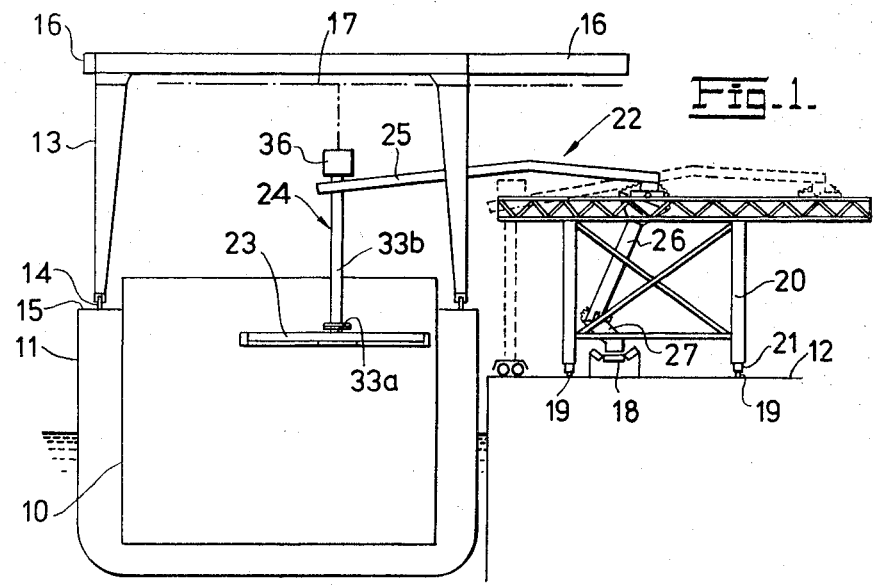
FIG. 1 is a view of the unloading assembly during a first phase of the unloading operation in section.
Figure 2:
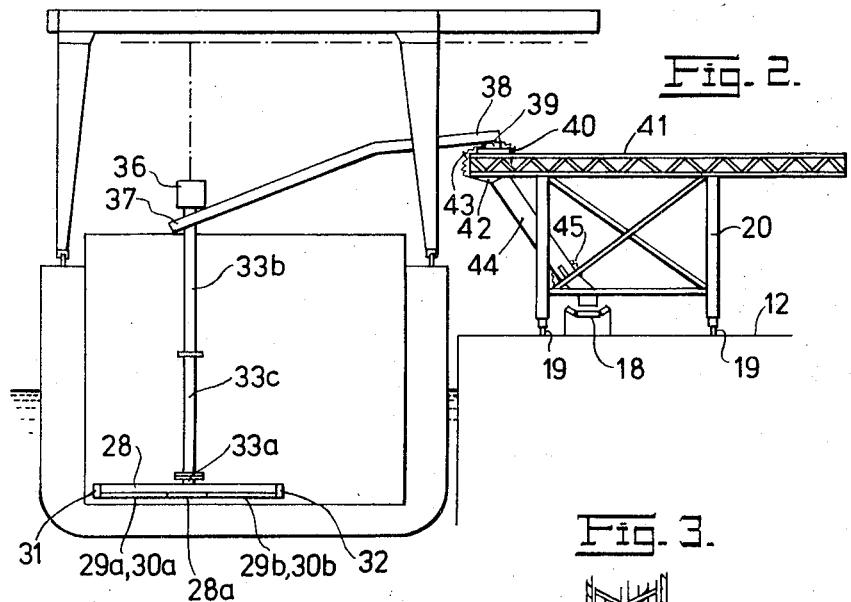
FIG. 2 is a sectional view of the unloading assembly during a concluding phase of the unloading operation.
Figure 3:
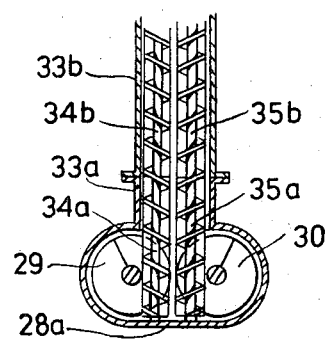
FIG. 3 is a section of a detail of the supply head.

Referring to FIGS. 1 and 2, a hold 10 in a ship 11 lies at a quay 12. Above the hatch of the hold, there is arranged a gantry crane 13 which can be displaced on rails 14 on the deck 15 of the ship. The gantry crane 13 is provided with cantilever arms 16 so that a traverse crane (not shown further) having associated travelling crab can be moved in a horizontal path as indicated by the chain line 17 from an arbitrary position above the hold to an arbitrary position above the quay supported in the cantilever arms 16.

On the quay 12, there is arranged a conveyor belt 18 parallel to the longitudinal direction of the ship and between a pair of parallel extending rails 19. A wagon 20 which with wheels 21 rolls on the rails 19, supports the one end of an unloading assembly 22, while the opposite end of the unloading assembly is suspended from the said travelling crab of the traverse crane in an active position as shown by the full lines. With the dotted lines, the unloading assembly is shown in an inactive position on the quay structure.

The unloading structure comprises a supply head 23, a first, upwardly extending conveyor 24, a second, transverse and relatively elongated conveyor 25 and a third, downwardly extending relatively short conveyor 26 and a delivery or discharge pipe 27 arranged stationarily in the wagon 20, the lower end of which terminates just above the conveyor belt 18.

The supply head 23 has its longitudinal extension across the ship and reaches over about half the breadth of the hold. The supply head 23 consists of a housing 28 downwardly opening at opposite end portions which above the whole length of the supply head screens two parallel extending screw conveyors 29, 30 which are driven by respective hydraulic driving motors 31, 32 from mutually opposite ends. Each screw conveyor 29, 30 is divided into two sections 29a, 29b and 30a, 30b respectively with mutually opposite thread directions so that each conveyor can supply material from opposite directions towards a central portion of the housing 28 which is covered below with a base plate 28a. The screws 29, 30 are turned from below and upwards towards a common intermediate space, that is to say with a mutually opposite direction of turn, so that the cargo can be fed inwards into the intermediate space and conveyed by the screws over to the central portion of the housing 28.

From the central portion of the supply head 23 there extends vertically upwards the said first conveyor 24 in the form of a first pipe section 33a having two parallel screw conveyors 34b, 35b which are operated from a common driving head 36. The screw conveyors 34a, 35a are connected, for ready dismantling, to screw conveyors 34b, 35b. In FIG. 1, there is illustrated the first pipe section 33a directly connected to the supply head 23, while the second pipe section 33b is joined to the supply head, designed for unloading about half the contents of the hold. In FIG. 2, there is illustrated the first pipe section 33a and the second pipe section 33b when there is inserted between these an extra third pipe section 33c designed similarly to section 33b. With the sections 33a, 33b and 33c the conveyor 24 is designed for unloading the other lower half of the contents of the hold. On moving the traverse crane in a direction transversely of the direction of the ship, the supply head 23 can be moved with the first conveyor 24 in the hold between its opposite sides as required. On moving the travelling crab of the traverse crane longitudinally of the ship the supply head can be correspondingly moved with the first conveyor between opposite end walls of the hold.

The conveyor 24 is connected just below the driving head 36 to the second conveyor 25 and the pipe section 33b passes through the one end of a pipe 37 of the second conveyor 25, turnably mounted in the latter about a horizontal axis which extends at right angles to the plane of the drawing. In addition, on the upper and lower side of the pipe 37, the pipe section 33b is sealed against the former by means of wave-like sealing means (not shown further).

The pipe 37 extends in the illustrated embodiment with a deflection approximately at the centre and includes a belt conveyor which delivers the conveyed material to the opposite end 38 where there are arranged driving means (not shown further) for the belt conveyor. The pipe end 38 is supported, via arms 39, in a guide member 40 which by means of wheels or rollers is displaceable towards and away from the ship 11 on a horizontal guide 41 on top of the wagon 20.

The guide member 40 carries rotatably mounted about the same horizontal axis of rotation as the rotating arms 39 of the pipe 37 are mounted on, a funnel 42 which is connected to the pipe end 38 with a sealing bellows 43. The funnel 42 is connected to a drop pipe 44 which forms the third conveyor. The drop pipe 44 is provided below with bearing-forming end slots which engage with horizontal trunnions on the delivery pipe 27. Between the lower end of the drop pipe 44 and the delivery pipe 27, there is arranged a sealing bellows 45 which permits turning between the drop pipe and the delivery pipe and, in addition, permits an axial displacement of the lower end of the drop pipe relative to the discharge pipe.

Alternatively, the drop pipe can be designed as a telescopic pipe.

There is indicated by dotted lines in FIG. 1, the supply head 23 in an inactive position turned 90° relative to the active position as shown in full lines and resting on the quay 12. The first conveyor 24 extends vertically upwards and supports the adjacent end of the conveyor 25. If necessary, the conveyor 24 and the adjacent end of the conveyor 25 can be carried by the one end of the guide 41. The opposite end 38 of the conveyor 25 rests via the guide member 40 on the opposite end of the guide 41 while the drop pipe 44 is dismantled from the guide member as well as from the delivery pipe.

The unloading structure is shown in full lines in FIG. 1 in a first active position and in FIG. 2 the unloading structure is shown in a second active position. It will be evident that the third conveyor turns to a significant degree between the two illustrated active positions relative to the delivery pipe and the second conveyor and, at the same time, is subjected as a result to a certain axial displacement which can be permitted by the bearing-forming lower end slots or by a telescopic pipe connection. By allowing the one end of the second conveyor to be suspended from the traverse crane of the gantry crane and its opposite end to be supported in the horizontal guide 41, the unloading structure can be readily adjusted to desired positions by manoeuvring the traverse crane in the gantry crane.

By moving the supply head along the ship in the hold by movement of the travelling crab of the traverse crane the wagon 20 and the associated end of the transport structure can be correspondingly moved longitudinally of the ship at the same time by suitably operating the wagon 20.

What I claim is:

1. In an assembly for unloading powdered material and the like from a ship's hold which comprises a supply head, a first conveyor arranged to receive said material fed from the supply head, a second conveyor arranged to receive said material on being lifted from the hold by said first conveyor, a third conveyor arranged to receive said material on being transferred by said second conveyor from a position above the hold to an elevated position outside the ship and a delivery pipe stationarily positioned relative to said conveyors for downwardly receiving said material from said third conveyor, said conveyors and said delivery pipe being linked to each other about mutually parallel horizontal axes and said supply head, said conveyors and said delivery pipe providing a dust-tight, closed passage for the powdered material, the improvement which consists in the supply head housing screw conveyors adapted to transfer said material to a supply head portion from which upstanding screw conveyors of said first conveyor directly extend, the point of linkage between the first and second conveyors being suspended from and regulatable vertically and horizontally by way of ship crane means while the point of linkage between the second and third conveyors is supported outside the ship on elevated guide means extending transversely of the direction of the ship.

2. The improved assembly according to claim 1, wherein the supply head extends in an operative position over not less than half the breadth of the hold.

3. The improved assembly according to claim 1, wherein the elevated guide means forms an upper portion of a wagon displaceable on rails extending longitudinally of and outside the ship.

4. The improved assembly according to claim 1, wherein the supply head portion from which the upstanding screw conveyors extend is disposed centrally of the supply head, the screw conveyors of the supply head are each arranged in parallel sections separated by the central supply head portion, said screw conveyors being adapted on turning to cause the material to be drawn through supply head openings on either side of said central portion and to occupy intermediate spaces between said parallel sections while being conveyed from opposite directions to said central portion and wherein said upstanding screw conveyors are also arranged in parallel and are adapted on turning to draw said material upwards through an intermediate space therebetween.

5. The improved assembly according to claim 4, wherein means for driving the parallel sections of the screw conveyors are located at opposite ends of the supply head.

6. The improved assembly according to claim 4, wherein means for driving the parallel screw conveyors of the first conveyor are located in a driving head at the uppermost end of said conveyor, said first conveyor passing through one end of the second conveyor at a location just below said driving head and being sealed against the second conveyor on the upper and lower sides thereof.

7. The improved assembly according to claim 1, wherein the second conveyor is bent upwardly approximately at its centre and houses a conveyor belt for delivering said material to the third conveyor and wherein means for driving the conveyor belt are located at the end of the second conveyor adjacent the third conveyor.

8. The improved assembly according to claim 7, wherein the end of the second conveyor adjacent the third conveyor is supported in a guide member which is displaceable towards and away from the ship on the elevated guide means.

9. The improved assembly according to claim 8, wherein the guide member supports a funnel rotatably mounted about a horizontal axis and connected uppermost to the end of the second conveyor adjacent the third conveyor with a sealing bellows and lowermost to the third conveyor.

10. The improved assembly according to claim 1, wherein the third conveyor is provided with bearing-forming end slots at its lowermost end and the delivery pipe for finally discharging said material has trunnions for engaging said slots, there being arranged a sealing bellows between the delivery pipe and the third conveyor permitting turning between said third conveyor and said delivery pipe and axial displacement of the lowermost end of said third conveyor relative to said delivery pipe.

11. The improved assembly according to claim 10, wherein a conveyor belt extends longitudinally of the ship and the delivery pipe is located in a fixed position relative to said conveyor belt for releasing said material thereon.

12. The improved assembly according to claim 1, wherein the third conveyor is a telescopic pipe and the delivery pipe for finally discharging said material is connected to the lowermost end of said telescopic pipe whereby axial displacement of the latter can take place relative to the delivery pipe, there being arranged a sealing bellows between said telescopic pipe and the delivery pipe permitting turning between the telescopic pipe and the delivery pipe.

13. The improved assembly according to claim 12, wherein a conveyor belt extends longitudinally of the ship and the delivery pipe is located in a fixed position relative to said conveyor belt for releasing said material thereon.

14. The improved assembly according to claim 1, wherein the first conveyor is formed in two sections having a joint length permitting the supply head to empty the top half of the hold, the two sections being separable to permit the insertion of a third section to extend the length of said conveyor and enable the lower half of the hold to be emptied.

* * * * *